UNITED STATES PATENT OFFICE.

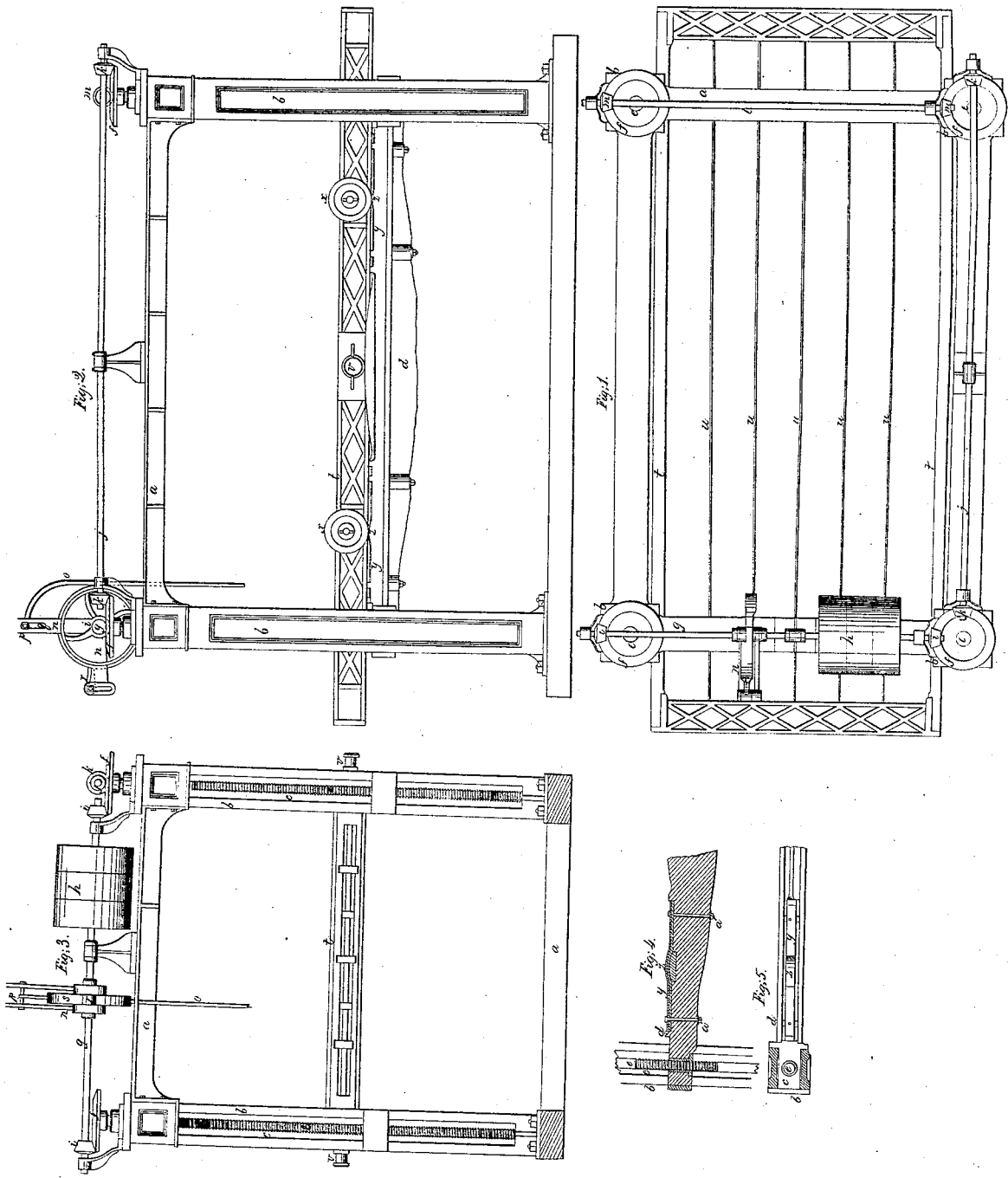

J. T. BRUEN AND J. G. WILSON, OF HASTINGS, NEW YORK.

MACHINE FOR SAWING STONE.

Specification of Letters Patent No. 9,513, dated January 4, 1853.

*To all whom it may concern:*

Be it known that we, JOHN T. BRUEN and JAMES G. WILSON, both of Hastings, West Chester county, New York, have invented certain Improvements in Machinery for Sawing Marble and other Stone, and that the following is a full, clear, and exact description thereof, reference being had to the accompanying drawing, making part of this specification, in which—

Figure 1 is a plan; Fig. 2, a side elevation; Fig. 3, an end elevation; Fig. 4, a longitudinal vertical section of one of the posts; and Fig. 5, a plan of the same.

The same letters indicate like parts in all the figures.

In our improved machinery for sawing marble and other kinds of stone the blades or saws are arranged in a reciprocating frame or gate which is guided laterally by working between guide posts, and provided with wheels which run on horizontal ways which move up and down in appropriate guides and sustained by vertical screws tapped through their ends, which screws are all geared so as to turn with equal velocity either in lifting the saw frame or letting it down to feed.

During the operation of sawing it is important that the saw be properly supplied with sand and water for well known reasons. If the saw be permitted to rest constantly on the bottom of the kerf, the grains of sand can not get between the edge of the saw and the stone for that reason saws for this purpose whether worked by hand or by power, have always heretofore been lifted up at the end of each stroke that the sand might be carried under the edge of the blade so that the weight of the saw blade &c., bearing on the grains of sand might cause their sharp angles to break down the texture of the stone. In saws worked by power there are serious objections to the lifting of the saw frame and its appendages at the end of its stroke. The crank shaft, from which the reciprocating motion is derived, being stationary, and the saw having an up and down range of motion equal to the thickness of stone to be cut through, it must follow that the range of the reciprocating motion will be greater when the plane of the saw-frame coincides with the axis of the crank shaft, than when above or below it, so that the lifting action must vary, lifting higher at one time than another. We have discovered that a much better effect is produced if the sand be introduced under the saw at the middle of its stroke than when introduced at the end, for the reason that the grains of sand are carried in one direction half the length of the stroke, and then back in the opposite direction, presenting on the return motion, opposite angles to act on the stone, while on the old plan the grains of sand act the whole length of the stroke in the same direction, and are then discharged. And what is of great importance in our plan the fresh grains of sand with their sharp angles are made to act on the stone when the saw is at its maximum velocity, while in the old plan this takes place when the saw has its minimum motion.

The nature of our invention consists in lifting the saw frame at or sufficiently near the middle of its range of motion to effect the contemplated purpose by means of inclined projections on the ways over which the wheels run. And our invention also consists in interposing india-rubber or its equivalent between the ways and the inclined projections to absorb or reduce the concussions which would otherwise take place when the wheels strike the said inclined projections.

In the accompanying drawing *a* represents the frame and *b* the corner posts or standards thereof which are made with mortises *c*, extending from near the top to near the bottom to receive the ends of two ways *d, d*, which are fitted to slide therein from top to bottom. The ends of these ways are formed with shoulders and caps to keep them in place. In each post there is a vertical screw shaft *e*, the lower end of which rests on, and turns in an appropriate step in the bottom of the mortise, and the upper end is fitted to turn in an appropriate box in the top of the post, the upper end of the said screw shaft extending up above the post and there provided with a bevel cog wheel *f*. The four screw shafts are mounted alike and the four wheels are of the same diameter. On one end of the frame there is a shaft *g* with fast and loose pulleys *h*, to receive a driving strap from some first mover. At the end it is provided with beveled pinions *i, i*, which engage two of the bevel wheels on the two screw shafts at that end of the frame. There is then another shaft *j* with two bevel pinions *k, k*, to communicate motion from one of these screw shafts to the third, and then a like shaft $l$, with pinions $m$, $m$, to communicate motion from the third to the fourth screw shaft. In this way when the driving strap is shifting from the fast to the loose pulley the four screw shafts are turned with equal velocity and in the same direction, and as the screw shafts are topped into the ends of the two ways $d$, $d$, they are lifted up and with them the saw frame which rests on them.

For the purpose of letting down the ways to give the feed motion there is a double arm lever $n$, that vibrates on the shaft $g$, one arm of which is connected with a connecting rod from an eccentric on some suitable driving shaft by means of a bolt $p$ passing through a slot $q$, so that the said connection can be adjusted at pleasure to any distance from the axis of vibration to vary the feed. The other arm of the said lever carries a jointed hand or pawl $r$, the surface of which when the lever turns in the direction of the arrow bites onto the surface of a wheel $s$, on the shaft $g$, to turn it and thereby give the feed. By this means any degree of feed can be given, a thing which can not be effected by the ratchet wheel for the teeth must be of a sufficient size to present the required strength, and no feed can be given which is less than what is due to one tooth, or more than one unless it be equal to two, and so on.

The saw frame $t$, is properly formed to receive the required number of blades or saws $u$. It is provided at or near the middle of its length with wrists $v$, $v$, one on each side, to which are jointed connecting rods from a crank shaft adapted in manner well known to give the required range of motion. This saw frame is provided with four wheels $x$, $x$, $x$, $x$, which run on the ways as guides to the motion, and the track of the ways on which the wheels run are formed each of a plate of metal $y$ bent in the middle to form a double inclined plane $z$, at the middle of the stroke of the saw frame for the purpose of lifting it up to let the sand and water run under the edges of the saws and then let down again while at or near its maximum speed. These plates are let into recesses in the ways and secured in place by screw bolts $a'$ $a'$. And for the purpose of absorbing or reducing the shock which the saw frame would experience when the wheels come in contact with the inclined planes, india rubber or its equivalent is interposed between the plates $y$ and the ways $d$. From this it will be seen that when the wheels reach the inclined planes the interposed springs yield slightly to prevent the shock which would otherwise throw up the saw frame, and cause it to fall by gravity with such force as to expel the grains of sand from under the edges of the blades. But by avoiding the shock the saw frame gradually descends and the edges come down on to the sand so as to make it act efficiently. It will also be seen that whatever may be range of motion of the saw frame it will at every stroke receive the same lifting motion. And that this lifting motion to permit the sand to pass under the edges of the saws, takes place while the saw is at its maximum motion, so that when the saws again descend, fresh grains of sand are brought into action that their sharp edges may act the better to break down the texture of the stone. On the return motion from the end to the middle, the grains of sand are rolled in the opposite direction to present fresh angles for action on the stone, while on all other plans heretofore practiced they run in the same direction the whole length of the stroke, and are then discharged by the lift followed up by a fresh supply. By the arrangement of the feed motion, which is susceptible of the finest adjustment, we are enabled to give the feed motion for every stroke instead of one feed motion for a series of strokes.

What we claim as our invention, and desire to secure by Letters Patent in the sawing of marble and other stone, is—

1. Lifting the saws at or sufficiently near the middle of the stroke to effect the herein specified purposes, substantially in the manner specified.

2. We also claim interposing india-rubber or its equivalent between the ways, and the inclined projections which lift the saw frame, substantially in the manner and for the purpose specified.

JNO. T. BRUEN.
JAMES G. WILSON.

Witnesses to signature of J. T. Bruen:
 CANSTEN BROWNE,
 ABEL PORTER BROWN.
Witnesses to signature of J. G. Wilson:
 C. W. M. KELLER,
 ABEL PORTER BROWN.